UNITED STATES PATENT OFFICE.

McKENZIE ARNN, OF BRISTOL, VIRGINIA, ASSIGNOR TO A. H. BLANCHARD, OF SAME PLACE.

COMPOSITION FOR COLORING AND PRESERVING WOOD, &c.

SPECIFICATION forming part of Letters Patent No. 601,767, dated April 5, 1898.

Application filed February 27, 1897. Serial No. 625,402. (No specimens.)

*To all whom it may concern:*

Be it known that I, McKENZIE ARNN, a citizen of the United States, residing at Bristol, in the county of Washington and State of Virginia, have invented certain new and useful Improvements in Compounds for Coloring and Preserving Timber, of which the following is a description.

This composition consists of the following ingredients combined in the proportion stated, to wit: ninety gallons of clear cold water, one hundred pounds of lime, one hundred pounds of salt, ten pounds of alum, ten pounds of blue-stone, ten pounds of copperas, two pounds of litharge, five pounds of gum-arabic, ten gallons of kerosene-oil. Stir them together well, and then add two pounds of metallic lead, five pounds of metallic zinc, one pound of metallic copper. After being dissolved in ten gallons of nitric acid, these ingredients are to be thoroughly mingled by agitation.

In using the above-named composition there should be vats made for the fluid where cold clear water can be turned in. This fluid will be ready for use in twenty-four hours after mixed as above. The vats are to be made large enough to hold the timbers or woods or materials to be oxidized or preserved, and after the fluid is placed in the vats the woods or timbers or materials to be oxidized must be placed in the vats and kept beneath the surface of the fluid from twenty-four hours to sixty days, depending upon the thickness and kind of material. I can oxidize or color or preserve all kinds of timbers, either green or seasoned. The fluid should be made in generating-tanks, so the fluid can be drawn off when needed. It must be stirred well while being drawn off. Timbers or materials thus oxidized will be impervious to insects, heat, light, and water. Timber is twenty per cent. less liable to burn, and it gives to timber not less than twenty-five per cent. of strength and makes it from one to one thousand times more durable. The material oxidized is susceptible of a very high polish without the use of paint or varnish.

Having now fully described my invention, what I claim as new, and desire to secure by Letters Patent, is—

The above-described composition for coloring, preserving and strengthening timber consisting of one hundred pounds lime, one hundred pounds salt, ten pounds alum, ten pounds of blue-stone, ten pounds of copperas, two pounds litharge, five pounds gum-arabic, ten gallons of kerosene-oil, mixed in clear water and stirred well, with two pounds metallic lead, five pounds metallic zinc, and one pound metallic copper dissolved in ten gallons nitric acid.

McKENZIE ARNN.

Witnesses:
A. A. HOBSON,
JNO. H. GOSE.